United States Patent
Polyakov

(10) Patent No.: US 9,478,098 B2
(45) Date of Patent: Oct. 25, 2016

(54) IN-GAME ADVERTISING FEATURE FOR CASINO FOOT TRAFFIC

(71) Applicant: DELONACO LIMITED, Nicosia (CY)

(72) Inventor: Maxym Polyakov, Menlo Park, CA (US)

(73) Assignee: Delonaco Limited, Nicosia (CY)

( * ) Notice: Subject to any disclaimer, the term of this patent is extended or adjusted under 35 U.S.C. 154(b) by 0 days.

(21) Appl. No.: 13/834,328

(22) Filed: Mar. 15, 2013

(65) Prior Publication Data
US 2014/0274310 A1  Sep. 18, 2014

(51) Int. Cl.
*G07F 17/32* (2006.01)
*G06Q 30/02* (2012.01)

(52) U.S. Cl.
CPC ....... *G07F 17/3218* (2013.01); *G06Q 30/0209* (2013.01); *G07F 17/3255* (2013.01); *G06Q 30/0261* (2013.01); *G06Q 30/0267* (2013.01)

(58) Field of Classification Search
USPC .......................................... 463/20, 25, 30, 32
See application file for complete search history.

(56) References Cited

U.S. PATENT DOCUMENTS

| | | | |
|---|---|---|---|
| 2007/0129136 A1* | 6/2007 | Walker et al. ................. | 463/25 |
| 2009/0082098 A1* | 3/2009 | Alderucci et al. ............. | 463/25 |
| 2009/0093290 A1* | 4/2009 | Lutnick et al. ................ | 463/16 |
| 2009/0270170 A1* | 10/2009 | Patton ............................ | 463/36 |

* cited by examiner

Primary Examiner — Paul A D'Agostino
Assistant Examiner — Brandon Gray
(74) Attorney, Agent, or Firm — Sheppard, Mullin Richter & Hampton LLP

(57) ABSTRACT

An in-game advertising system that provides benefits to gamers, game publishers and casinos by offering in-game awards as part of the electronic game plot that the gamer is playing on the gamer's mobile device.

8 Claims, 5 Drawing Sheets

IN-GAME ADVERTISING FEATURE FOR CASINO FOOT TRAFFIC

TECHNICAL FIELD

The present invention is directed to an online game feature for increasing foot traffic to casinos.

DETAILED DESCRIPTION

According to certain embodiments, electronic games (games played on a device) includes an incentive feature that creates game monetization opportunities by generating offline foot traffic to casinos, for example.

According to certain embodiments, the incentive feature is part of the electronic game plot or game scenario rather than merely an advertisement banner that is separate from the game. To explain, the design of the game plot includes such an incentive feature as an organic in-game feature.

For example, in an electronic game if a gamer uses the incentive feature and the gamer may be awarded game items for use in the electronic game itself. For purposes of explanation, assume an electronic game involving the slaying of imaginary dragons. A game item may be an imaginary magic sword that the gamer can use in the game to slay the imaginary dragons. The gamer can purchase the imaginary sword or the gamer may be given the imaginary sword by using the incentive feature that is provided in the game. According to certain embodiments, the incentive feature advertises an offer to the gamer when providing the game item to the gamer. In other words, the advertising occurs in the game and while the gamer is playing the game. By viewing the advertisement, the gamer earns the game item. Thus the advertised offer is an integral part of the game plot. Other examples of electronic games include gambling type games. As another non-limiting example, an in-game award can be in the form of bitcoins.

Such an incentive feature is included in electronic games to attract consumers such as gamers that may be naturally inclined to gamble. Thus, according to certain embodiments, the incentive feature includes offers or advertising information related to casinos.

According to certain embodiments, such an in-game incentive feature can provide the benefits to the gamer, the game publisher and casinos.

Figure 1:
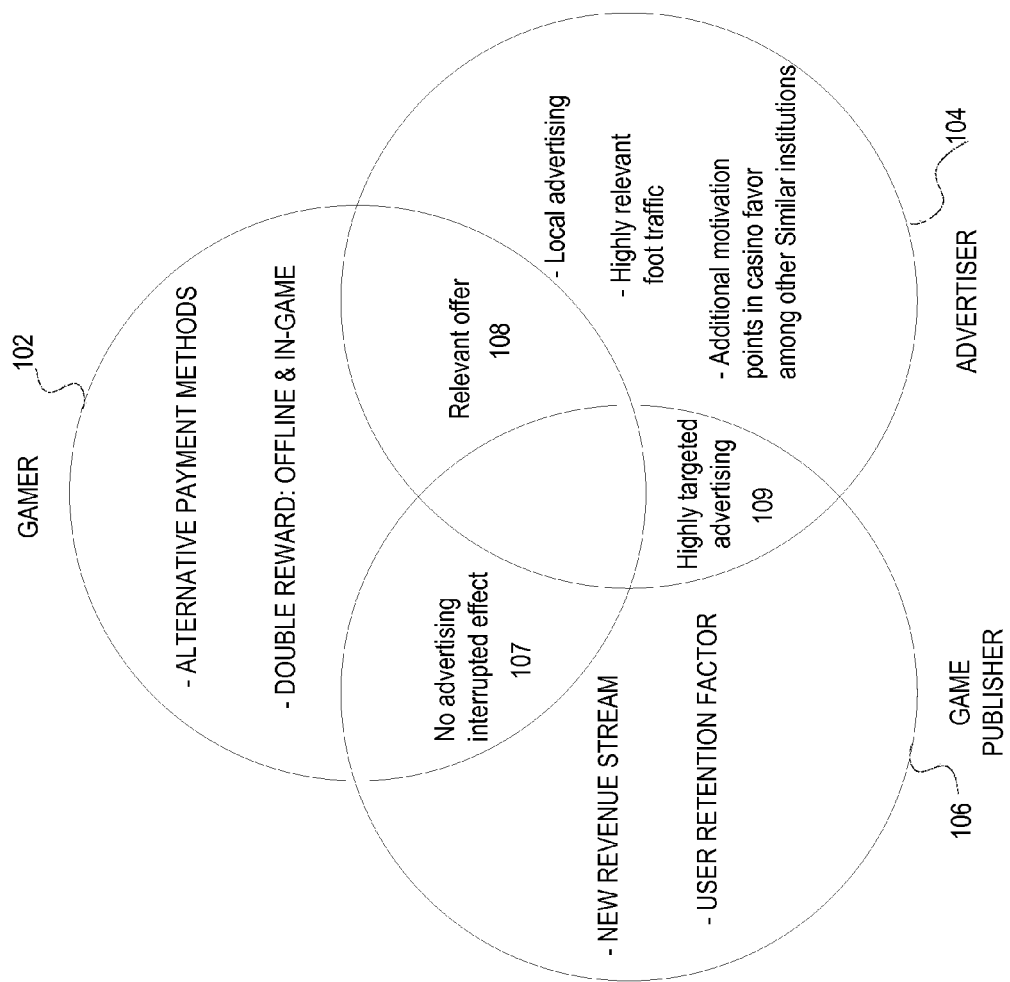
FIG. 1 illustrates some benefits provided by in-game advertising in electronic games, according to certain embodiments.

FIG. 1 illustrates some benefits provided by in-game advertising in electronic games, according to certain embodiments. FIG. 1 shows gamer benefits 102 going to the gamer, advertiser benefits 104 going to the local advertiser (e.g., a brick & mortar casino), and game publisher benefits 106 going to the game publisher. A brick & mortar casino is herein referred to as an offline casino. Gamer benefits 102 include but are not limited to: 1) alternative payment methods for playing an electronic game in which the in-game incentive feature is included, and 2) a double reward in the form of an in-game reward and an offline reward. An offline rewards is a reward received at a brick & mortar establishment when the user visits that establishment. Advertiser benefits 104 include but are not limited to: 1) local advertising to gamers, 2) increase relevant foot traffic to the offline casino (relevant because gamers usually have a propensity to gamble), and 3) opportunity to provide additional motivation points in the casino, where the motivation points may be associated with benefits provided by partner businesses of the offline casino (e.g. free restaurant food from restaurant partner or free hotel lodging hotel partner). Game publisher benefits 106 include but are not limited to: 1) increase in game revenue from affiliate commissions, and 2) gain loyalty of the gamer to the game (user retention—gamer returns to play the game over and over). Further, gamers and game publishers share the benefit of non-interruption effect 107 of the in-game advertising. For example, while playing the electronic game, the gamer is not interrupted by traditional type advertisements because the in-game advertisement is already organically incorporated into the game. Gamers and advertisers (e.g., offline casino) may also share the benefit of relevant offers 108. Game publishers and advertisers may also share the benefit of highly targeted advertising 109.

Thus, the gamer obtains a reward from the game and the casino. The casino, in turn, gets the benefit of having to pay a commission only for customers (e.g. the gamers who acted on the in-game advertising) that visit the casino and or made a purchase at the casino, rather than paying for mere advertising click-throughs or mere advertising impressions. The game publishers are able to increase their game revenues by getting commissions from affiliates.

Thus, according to certain embodiments, the electronic game incentive feature: 1) provides an unobtrusive advertising service that is an organic part of a game scenario, 2) provides gamers with relevant offers based on price and geo location, 3) provides incentive for gamers to visit advertisers' establishments, make purchases at such establishments and further receiving additional rewards for visiting and making purchases.

Figure 2:
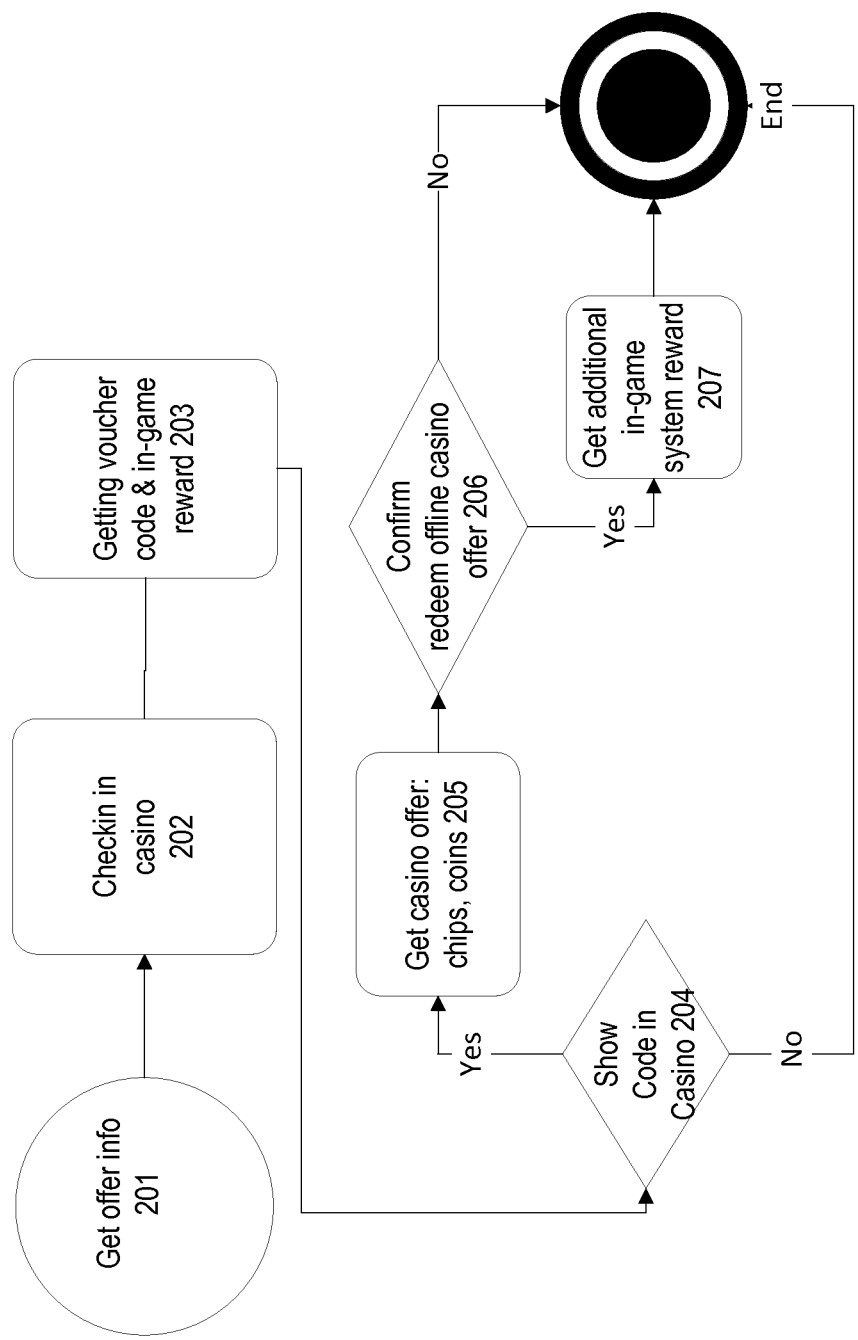
FIG. 2 is a high-level diagram illustrating some of the features of the in-game advertising service, according to certain embodiments.

FIG. 2 is a high-level diagram illustrating some of the features of the in-game advertising service, according to certain embodiments. At block 201, the user (e.g., gamer) gets offer information in-game advertising service while playing an electronic game on the user's device. Assume that the offer information is an offer associated with a given casino that is geographically close by to the user, for example. At block 202, the user checks in at the given casino. The user can check in proactively or the check-in can occur automatically when the user's device enters the target radius. When the user checks in at the casino, then at block 203 the user gets two types of rewards through the user's device: an in-game reward associated with the electronic game itself and an electronic casino voucher code for use in the casino. At block 204, if the user shows the received electronic casino voucher code to a casino operator, for example, then at block 205, the user receives a voucher for casino chips and/or casino coins, for example. It is to be noted that the casino voucher code is merely one example of confirmation. The confirmation can be any form such as an electronic picture, symbol, other types of codes, messages etc. Thus, the user gets an initial amount of casino chips/coins without spending his/her own money. At block 206, if the user confirms (or the system can confirm) that the user has redeemed/activated the casino voucher for chips/coins, then at block 207, the user gets an additional rewards from the in-game advertising system.

Thus, the user can start gambling at the casino using the redeemed initial amount of casino chips/coins. The casino benefits when the user buys more chips/coins for more gambling at the casino. Also, according to certain embodiments, the additional rewards may be substantially more valuable than the initial in-game reward received when the user checked in at the offline casino. Thus, the gamer becomes very loyal to both the game and the casino because the gamer gets in-game rewards and casino rewards like initial amount of free chips/coins.

According to certain embodiments, the number and or value of the rewards increase when the user makes more and more purchases. For example, the in-game rewards and casino rewards increase when the gamer buys more chips/coins for more gambling. Thus, the gamer is incentivized to make more purchases.

According to certain embodiments, when the gamer checks in at the brick & mortar casino, the affiliates of the in-game advertising system receive a commission. As previously explained, the user can check in proactively or the check-in can occur automatically when the user's device enters the target radius. For example, the game publisher and the in-game advertising system provider get commissions (herein referred to as "affiliate payment") when the gamer checks in at the casino. Casinos that are participating in the in-game advertising system are herein referred to as "partner casinos." Game publishers that are participating in the in-game advertising system are herein referred to as partner game publishers. Any advertisers that are participating in the in-game advertising system is herein referred to as "partner advertisers."

According to certain embodiments, the in-game advertising system rewards the gamer with a "visit bonus" through the in-game advertising application on the gamer's device (e.g., on gamer's smart phone) after the game arrives at a partner casino's establishment.

According to certain embodiments, the in-game advertising system enables confirmation of purchases made by the gamer at a casino by checking photo download (photo to show purchase), checking codes input, checking photo of product purchases, checking QR Codes associated with the purchase, etc. According to certain embodiments, the rewards from the in-game advertising system for purchases made at the partner casino's establishment are more substantial in value than the rewards for merely visiting the partner casino's establishment. Thus, partner casinos and partner advertisers are paying (affiliate payments) for actual visitors and or purchasers rather than mere advertising impressions and click-throughs. Thus, the in-game advertising system provider and the game publishers can earn commissions associated with the purchases by the gamer.

According to certain embodiments, the in-game advertising system uses geo-targeting to track a gamer's movement by accessing the geo location information from the gamer's mobile device (e.g., smartphone). For example, if the gamer's geo location happens to be close to the location of partner Casino X, then the in-game advertising system will offer the gamer Casino X's offer information through the electronic game that the gamer is playing at the time. Thus, the gamer thus not have to expend much effort to get to Casino X's establishment to obtain rewards as described herein. Further, by tracking the gamer's movements through geo targeting, the casino and the electronic game can offer different offers depending on the user's movements. For example, if the gamer is near a high-stakes gaming table in the casino, the casino and or the game can offer additional rewards to the gamer to tempt the gamer into gambling at the high-stakes gaming table. As another example, if the geo targeting feature indicates that the gamer is leaving the casino premises, the casino (and the electronic game) can offer a special bonus or other types of rewards that will entice the gamer to stay at the casino rather than leave.

Figure 3:
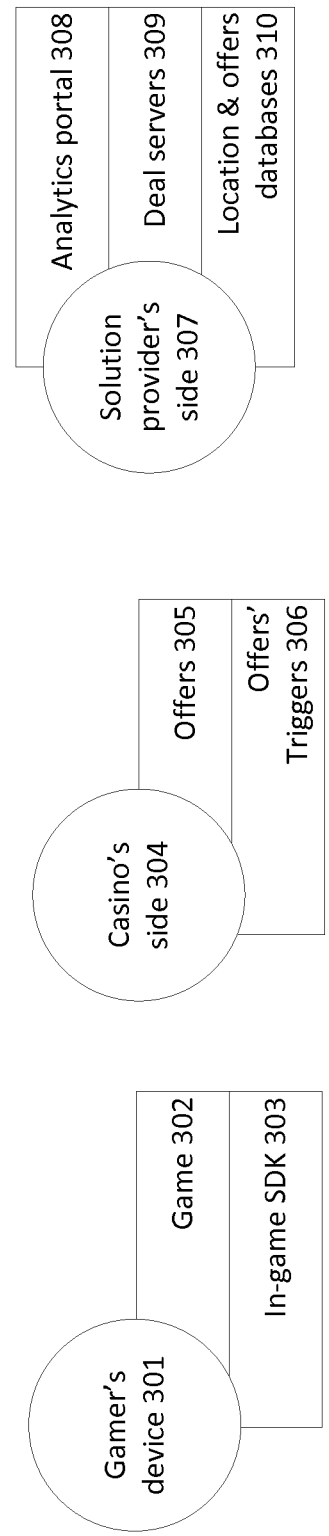
FIG. 3 is a high-level diagram of the main system components, according to certain embodiments.

FIG. 3 is a high level diagram of the main system components, according to certain embodiments. FIG. 3 shows some system components such as gamer's device 301, casino subsystem 304, and in-game advertising system provider 307.

According to certain embodiments, gamer's device 301 may be a smart phone or other suitable mobile device. The gamer's device 301 includes one or more games 302 (gambling type games, for example) with an implemented in-game SDK 303 (software development kit). According to certain embodiments, the in-game SDK: 1) allows for device location tracking after the application requests for permission from the gamer (the gamer can allow or deny this request), 2) provides the gamer with relevant offers from local advertisers (e.g. local casinos) based on the geo location information of the gamer, 3) shows relevant in-game user experience elements, 4) collects statistics associated with the in-game advertising system, 5) aggregates necessary data for proper operation of the in-game advertising solution, and 6) transfers data to in-game advertising system servers for further processing. User experience elements may vary from electronic game to electronic game. Non-limiting examples of user experience elements include:
   reward information: any element in the game's design that can be used to give information on a possible reward
   maps of partner advertisers' (casino) establishments stylized as an element in game
   reward redemption confirmation stylized as an element in game
   purchase confirmation stylized as an element in game According to certain embodiments, the statistics collected include but are not limited to:
   impressions of user experience elements
   click-throughs on user experience elements
   confirmed purchases in partners' establishments
   number of game installs
   number of users
   start points views—the number of start points impressions
   start points clicks—the number of start points clicks
   visit check-ins—the number of gamers who got visit rewards
   purchase alert views—the number of purchase alerts impressions
   purchase alert clicks—the number of purchase alerts clicks The above statistics is collected, aggregated and customized based on the partner, the campaign, the offers, and the target users or gamers.

According to certain embodiments, information needed for proper operation of the in-game advertising solution includes but is not limited to information on: partners' offers, partners' geo location, user's geo location, number of user's visits to the same casino during a given period of time, affiliate rewards for currently available offers, etc.

According to certain embodiments, casino subsystem 304 includes casino offers 305 and offers' triggers 306. According to certain embodiments, casino offers 305 are customized and implemented by the SDK before campaign launch.

According to certain other embodiments, casino offers 305 can be modified after launch of campaign (for example, when the in-game advertising solution is implemented as a SAS system (Software As a Service) and the electronic games are also implemented as part of the SAS system, in which case the in-game offers and rewards can be modified at any time during the campaign.

Non-limiting examples of casino offers include: 1) vouchers for casino chips/coins, 2) vouchers for playing gambling games, 3) vouchers for hotel service, 4) vouchers for free meals etc.

According to certain embodiments, in-game advertising system provider 307 includes analytics portal 308, deal servers 309, location and offers databases 310. The analytics portal 308 provides access to campaign management data and analytical data associated with campaigns that are in operation. The analytical data includes geo location information, information on offers, information on affiliate commissions for visits and purchases, timing of campaigns etc.

According to certain embodiments, the in-game advertising system uses the following types of data: 1) in-game events data, 2) geo-location data, 3) partners' information, and 4) user's activity history with respect to the current casino, etc.

In-game events data include but are not limited to: 1) start points, 2) information alerts, 3) information maps, and 4) reward alerts.

Start points are any type of user experience elements, such as banners, pages, buttons that activates the in-game advertising system. Start points appear in the game user experience as part of the game plot or game scenario just in case the user gets within the relevant information radius as described in greater detail below. Information alerts are any type of user experience elements such as banners, pages, buttons that inform gamers about offers and rewards that are available to the gamers. Information map is an embedded in-game map showing location of partners' establishments that are nearby the gamer's geo location. Reward alerts are any type of user experience such as banners, pages, buttons that inform gamers about opportunities for obtaining rewards.

Geo-location data include: 1) the gamer's coordinates, and 2) partner establishment coordinates. The game requests the gamer's permission to share geo coordinates with the in-game advertising system. There are two types of distances from a given partner's establishment: 1) information radius, and 2) target radius.

Information radius is a distance that is not far off from the partner's establishment. In the information radius, start points automatically appear in game user experience elements as part of the game plot or game scenario so that the gamer is presented with information about available offers. Information radius can be customized for each advertising campaign.

Target radius is the coordinates of a partner's establishment. Gamers automatically get reward alerts when the gamer arrives within this target radius. The gamers also start getting new information alerts about more valuable offers for various purchases in partner's establishments.

Partner's information includes information associated with the active campaigns for the partner. Campaign information includes: 1) active offers, 2) descriptions of offers, 3) appropriate rewards for the gamers, 4) affiliates commissions, and 5) geo-location information for available offers.

According to certain embodiments, the partner casino promotion starts when the gamer arrives within the information radius. The first step of the promotion is to convert the gamer into a casino visitor. The next step is to convert the casino visitor into a casino client. The promotion can be unilateral in that the electronic game merely informs gamers about casino offers and does not need any confirmation from gamers as to the gamers' purchases. According to certain embodiments, the promotion may be bilateral in that both the casino and the game motivate the gamer to make a purchase.

Figure 4:
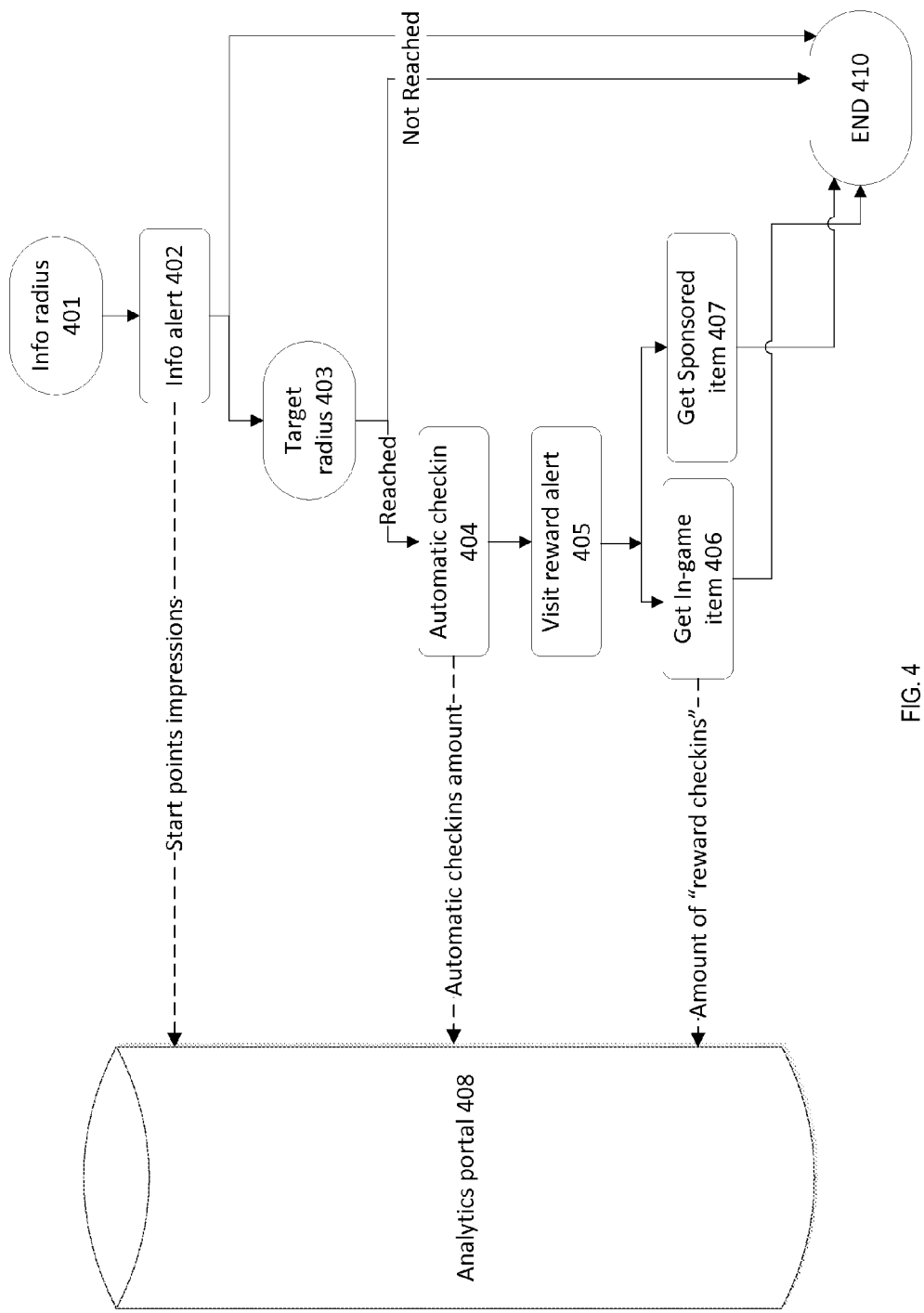
FIG. 4 is a functional overview of converting a gamer to a casino visitor by the in-game advertising system, according to certain embodiments.

FIG. 4 is a functional overview of converting a gamer to a casino visitor by the in-game advertising system, according to certain embodiments. In FIG. 4, at block 401, the in-game offer/advertisement is activated as part of the game plot or game scenario when a given gamer is arrives at the information radius. Start points impressions information may be sent to the analytics portal 408. At block 402, the gamer starts to receive information about available nearby offers as part of the electronic game plot or scenario. The offer is executed when the gamer confirms his/her visit to casino or upon automatic check-in. Each offer has its appropriate in-game reward. "Visit" offers are often the less valuable in-game rewards. At block 403, when the gamer arrives at the target radius, there may be an automatic check-in 404 that can trigger an appropriate in-game reward alert 405. The number of automatic check-ins information and confirmation may be sent to the analytics portal 408. At block 406, the gamer accepts an in-game reward. The number of reward check-ins information and confirmation may be sent to the analytics portal 408. At block 406, the gamer accepts the sponsored reward (reward from the given partner casino). The visit confirmation, the in-game reward acceptance confirmation and in-casino reward acceptance confirmation can trigger affiliate commission charges. An example of an affiliate commission model is pay-per-visit.

Figure 5:
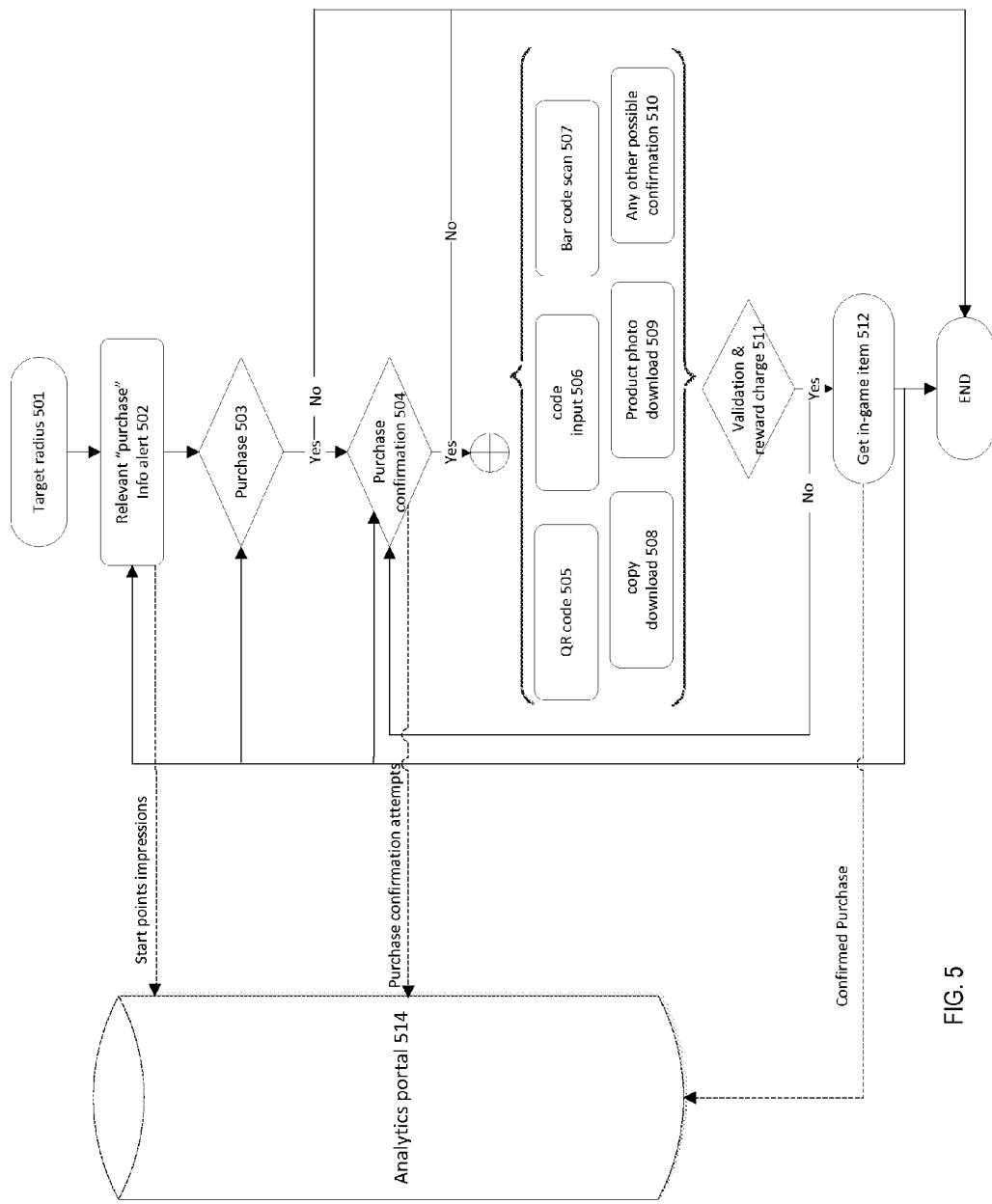
FIG. 5 is a functional overview of converting a casino visitor to a casino buyer by the in-game advertising system, according to certain embodiments.

FIG. 5 is a functional overview of converting a casino visitor to a casino client (casino buyer) by the in-game advertising system, according to certain embodiments. In FIG. 5, at block 501, the in-game offer/advertisement is activated as part of the game plot or game scenario when a given gamer is arrives at the target radius. At block 502, the gamer starts to receive relevant purchase information alerts such as information about available in-casino bonuses and appropriate in-game award as part of the electronic game plot or scenario. Start points impressions information may be sent to the analytics portal 514. At block 503, the gamer makes a purchase in the casino, and at block 504, the gamer confirms the purchase using an appropriate confirmation method (for example, via QR code 505, via code input 506, via bar code scan 507, via copy download 508, via product photo download 509, or via other confirmation method 510). Purchase confirmation attempts information may be sent to the analytics portal 514. At block 511, if the purchase validation and reward charge (affiliate commission) is successful, then at block 512, the gamer gets the in-game award and can also receive in-game vouchers for further offline awards. Information of confirmed purchases may be sent to the analytics portal 514. Examples of affiliate commission models include pay-per-lead, pay-per-sale, pay-per percentage of sale for a selected product, pay-per-sale based on the amount/quantity of a specific product.

According to certain embodiments, the retention scheme is similar to the "casino visitor-to-casino buyer" scheme. The difference is that gamers receive special offers when they are leaving the casino, e.g., when the gamer is outside the target radius. The in-game offer/advertisement is activated to offer special offers to the gamer when a given gamer leaves the target radius and arrives outside the target radius. If the gamer comes back to the casino, there may be two types of re-visit confirmation: 1) an initial automatic check-in when the game arrives at the target radius or 2) a confirmation of the gamer accepting the special offers for re-visiting the casino. Both types of confirmation may cause affiliate commission charges. At least one type of confirmation is needed. Examples of affiliate commission models include pay-per-visit, and pay-per-sale.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. An electronic game comprising:
   a communication interface for obtaining geo location information of a device on which the electronic game is being played; and
   at least one campaign module for providing:
      one or more in-game offers from a casino when the device on which the electronic game is being played is within a pre-defined information radius of the casino's geo co-ordinates;
      one or more in-game rewards from the electronic game when the device on which the electronic game is being played is within a pre-defined target radius of the casino's geo co-ordinates; and
      additional in-game vouchers for offline rewards from the casino when a gamer associated with the electronic game makes a purchase at the casino;
   wherein the one or more in-game offers and the one or more in-game rewards are presented as a part of a game plot of the electronic game by organically incorporating the one or more in-game offers and the one or more in-game rewards into at least one element of the game plot of the electronic game while the electronic game is being played.

2. The electronic game of claim 1, further comprising additional in-game rewards from the electronic game when the gamer associated with the electronic game makes a purchase at the casino.

3. The electronic game of claim 1, further comprising bonus in-game offers from the electronic game when the device on which the electronic game is being played leaves the pre-defined target radius of the casino's geo co-ordinates.

4. The electronic game of claim 1, further comprising bonus in-game offers from the casino when the device on which the electronic game is being played leaves the pre-defined target radius of the casino's geo co-ordinates.

5. A computer-implemented method comprising:
   obtaining geo location information of a device on which an electronic game is being played;
   providing one or more in-game offers from a casino when the device on which the electronic game is being played is within a pre-defined information radius of the casino's geo co-ordinates;
   providing one or more in-game rewards from the electronic game when the device on which the electronic game is being played is within a pre-defined target radius of the casino's geo co-ordinates;
   awarding additional in-game vouchers for offline rewards from the casino when a gamer associated with the electronic game makes a purchase at the casino; and
   presenting the one or more in-game offers and the one or more in-game rewards as a part of a game plot of the electronic game by organically incorporating the one or more in-game offers and the one or more in-game rewards into at least one element of the game plot of the electronic game while the electronic game is being played.

6. The computer-implemented method of claim 5, further comprising awarding additional in-game rewards from the electronic game when the gamer associated with the electronic game makes a purchase at the casino.

7. The computer-implemented method of claim 5, further comprising awarding bonus in-game offers from the electronic game when the device on which the electronic game is being played leaves the pre-defined target radius of the casino's geo co-ordinates.

8. The computer-implemented method of claim 5, further comprising bonus in-game offers from the casino when the device on which the electronic game is being played leaves the pre-defined target radius of the casino's geo co-ordinates.

* * * * *